US012104922B2

United States Patent
Jin et al.

(10) Patent No.: US 12,104,922 B2
(45) Date of Patent: Oct. 1, 2024

(54) SYNCHRONIZING NEIGHBORING TILES IN A HIGH DEFINITION MAP

(71) Applicant: TOYOTA RESEARCH INSTITUTE, INC., Los Altos, CA (US)

(72) Inventors: Hai Jin, Fremont, CA (US); Federico Boniardi, Mountain View, CA (US); Xipeng Wang, Ann Arbor, MI (US); Paul Ozog, Ann Arbor, MI (US); Chong Zhang, Ann Arbor, MI (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 217 days.

(21) Appl. No.: 17/733,948

(22) Filed: Apr. 29, 2022

(65) Prior Publication Data

US 2023/0349720 A1 Nov. 2, 2023

(51) Int. Cl.
*G01C 21/00* (2006.01)
*G01C 21/30* (2006.01)

(52) U.S. Cl.
CPC ......... *G01C 21/3881* (2020.08); *G01C 21/30* (2013.01); *G01C 21/3815* (2020.08)

(58) Field of Classification Search
CPC . G01C 21/3881; G01C 21/30; G01C 21/3815
See application file for complete search history.

(56) References Cited

U.S. PATENT DOCUMENTS

| | | | |
|---|---|---|---|
| 10,217,232 B2 | 2/2019 | Harada | |
| 10,222,211 B2 | 3/2019 | Chen et al. | |
| 10,803,096 B2 | 10/2020 | Anatassov | |
| 11,237,005 B2 | 2/2022 | Gustafsson et al. | |
| 2010/0225651 A1* | 9/2010 | Nomura | G01C 21/3867 345/441 |
| 2016/0371326 A1* | 12/2016 | Gotoh | G06F 16/2393 |
| 2016/0371864 A1* | 12/2016 | Gotoh | G06F 9/5083 |
| 2017/0322037 A1* | 11/2017 | Gonopolskiy | G01C 21/3881 |
| 2019/0258251 A1 | 8/2019 | Ditty et al. | |
| 2021/0142077 A1 | 5/2021 | Cox et al. | |
| 2021/0381848 A1 | 12/2021 | Schwartz et al. | |

FOREIGN PATENT DOCUMENTS

WO 2021191683 A1 3/2021

OTHER PUBLICATIONS

Hamraz, et al., "A scalable approach for tree segmentation within small-footprint airborne LiDAR data", in Computers and Geosciences 102 (pp. 139-147) (2017).

* cited by examiner

*Primary Examiner* — Dale Moyer
(74) *Attorney, Agent, or Firm* — SEYFARTH SHAW LLP

(57) ABSTRACT

A method for synchronizing neighboring tiles in an electronic map is described. The method includes grouping neighboring tiles of the electronic map into a plurality of tile groups. The method also includes selecting a first tile group and a second tile group that border one another on at least a first tile in the first tile group and a second tile in the second tile group. The method further includes independently optimizing the first tile group and the second tile group if a feature crosses between the first tile group and the second tile group. The method also includes shifting a border of the first tile group and a border of the second tile group to join the first tile and the second tile in the second tile group or the first tile group.

20 Claims, 12 Drawing Sheets

SYNCHRONIZING NEIGHBORING TILES IN A HIGH DEFINITION MAP

BACKGROUND

Field

Certain aspects of the present disclosure generally relate to machine learning and, more particularly, synchronizing neighboring tiles in a high definition (HD) map.

Background

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision remains a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents, as well as advanced driver assistance systems (ADAS), may rely on an annotated high definition map to navigate surrounding roads and highways to reach a destination. Electronic maps, such as high definition (HD) maps utilized by autonomous vehicles, are typically broken into tiles, such as hexagonal tiles. Each of these tiles may include cells that define features within the tiles, such as locations of roads. Unfortunately, features, such as roads, may span multiple neighboring tiles. Achieving a matchup between roads and features of the neighboring tiles generally involves significant computational resources. A method that utilizes grouped optimization to match features across neighboring tiles is desired.

SUMMARY

A method for synchronizing neighboring tiles in an electronic map is described. The method includes grouping neighboring tiles of the electronic map into a plurality of tile groups. The method also includes selecting a first tile group and a second tile group that border one another on at least a first tile in the first tile group and a second tile in the second tile group. The method further includes independently optimizing the first tile group and the second tile group if a feature crosses between the first tile group and the second tile group. The method also includes shifting a border of the first tile group and a border of the second tile group to join the first tile and the second tile in the second tile group or the first tile group.

A non-transitory computer-readable medium having program code recorded thereon for synchronizing neighboring tiles in an electronic map is described. The program code is executed by a processor. The method non-transitory computer-readable medium includes program code to group neighboring tiles of the electronic map into a plurality of tile groups. The method non-transitory computer-readable medium also includes program code to select a first tile group and a second tile group that border one another on at least a first tile in the first tile group and a second tile in the second tile group. The method non-transitory computer-readable medium further includes program code to independently optimize the first tile group and the second tile group if a feature crosses between the first tile group and the second tile group. The method non-transitory computer-readable medium also includes program code to shift a border of the first tile group and a border of the second tile group to join the first tile and the second tile in the second tile group or the first tile group.

A system for synchronizing neighboring tiles in an electronic map is described. The system includes a tile group formation module to group neighboring tiles of the electronic map into a plurality of tile groups. The system also includes a neighboring tile group selection module to select a first tile group and a second tile group that border one another on at least a first tile in the first tile group and a second tile in the second tile group. The system further includes a neighboring tile group synchronization module to independently optimize the first tile group and the second tile group if a feature crosses between the first tile group and the second tile group. The system also includes a tile group border shift module to shift a border of the first tile group and a border of the second tile group to join the first tile and the second tile in the second tile group or the first tile group.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
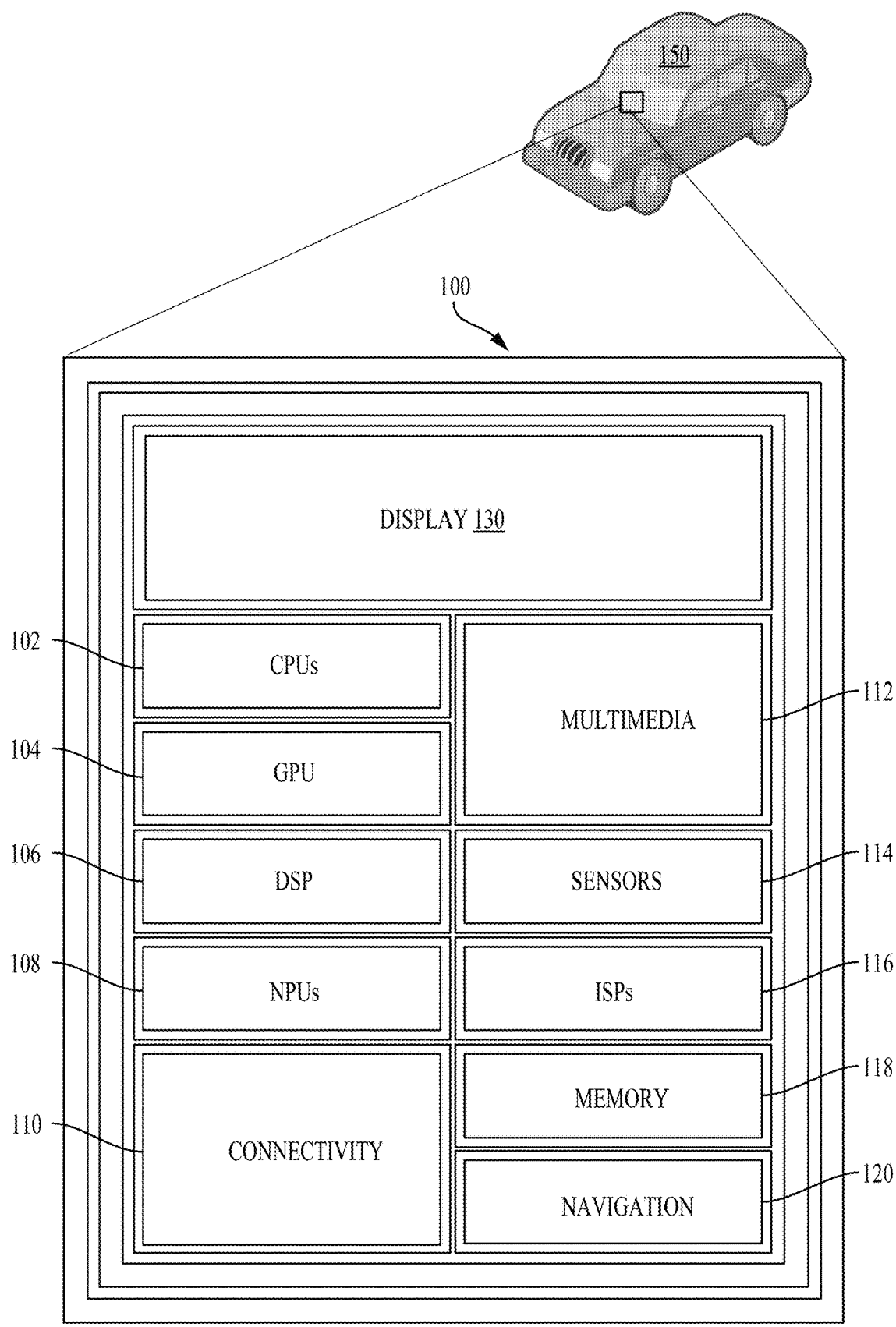
FIG. 1 illustrates an example implementation of designing a system using a system-on-a-chip (SOC) for neighboring tile synchronization in high definition (HD) maps, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, as well as advanced driver assistance systems (ADAS), may rely on an annotated high definition map to provide surrounding vehicle information. Unfortunately, an annotated, high definition (HD) map is both difficult to create and expensive to maintain. HD maps may enable state-of-the-art performance for autonomous driving and ADAS systems. During autonomous operation, an HD map can provide information on the surroundings of an ego vehicle. In practice, an annotated HD map is both difficult to create and expensive to maintain. An HD map may provide for autonomous vehicles and ADAS systems to perform prediction and planning of, for example, a trajectory of an ego vehicle.

Operation of autonomous agents and ADAS systems generally relies on an annotated HD map to navigate surrounding roads and highways to reach a destination. Electronic maps, such as HD maps utilized by autonomous vehicles, are typically broken into tiles, such as hexagonal tiles. Each of these tiles may include cells that define features within the tiles, such as locations of roads. Unfortunately, features, such as roads, may span multiple neighboring tiles. Achieving a matchup between roads and features of the neighboring tiles generally involves significant computational resources.

A method that utilizes grouped optimization to match features across neighboring tiles is desired. Aspects of the present disclosure recognize that HD maps utilized by autonomous vehicles, are typically broken into tiles, such as hexagonal tiles, including cells that define features within the tiles, such as locations of roads. When road features span multiple tiles, achieving a perfect matchup between road features of neighboring tiles generally involves significant computational resources. Some aspects of the present disclosure are directed to a method that utilizes grouped optimization to match road features across neighboring tiles.

In some aspects of the present disclosure, a neighboring tile synchronization method divides tiles into separate groups of tiles (e.g., groups of seven). In this configuration, road features that cross boundaries of a tile group are independently optimized. Stated differently, a first group is independently optimized and a second group is independently optimized. The process optimizes the conditional distribution of each of the boundary crossings. Importantly, individual tiles are not optimized, only features that cross tile groups. To optimize road features that cross other tiles within a group, the neighboring tile synchronization method shifts the borders of the tile groups to ensure that each tile undergoes a joint optimization with its neighbors. This shifting continues until each tile has undergone a joint optimization.

FIG. 1 illustrates an example implementation of the aforementioned system and method for neighboring tile synchronization in high definition (HD) maps using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130, illustrating a view of a vehicle. In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for electronic map feature synchronization based on synchronizing neighboring tile groups in high definition (HD) maps in response to road features in the images captured by the sensors 114.

The instructions loaded into a processor (e.g., NPU 108) may also include code to group neighboring tiles of the electronic map into tile groups. The instructions loaded into a processor (e.g., NPU 108) may also include code to select a first tile group and a second tile group that border one another on a first tile in the first tile group and a second tile in the second tile group. The instructions loaded into a processor (e.g., NPU 108) may also include code to independently optimize the first tile group and the second tile group if a feature crosses between the first tile group and the second tile group. The instructions loaded into a processor (e.g., NPU 108) may also include code to shift a border of the first tile group and a border of the second tile group to join the first tile and the second tile in the second tile group or the first tile group.

Figure 2:
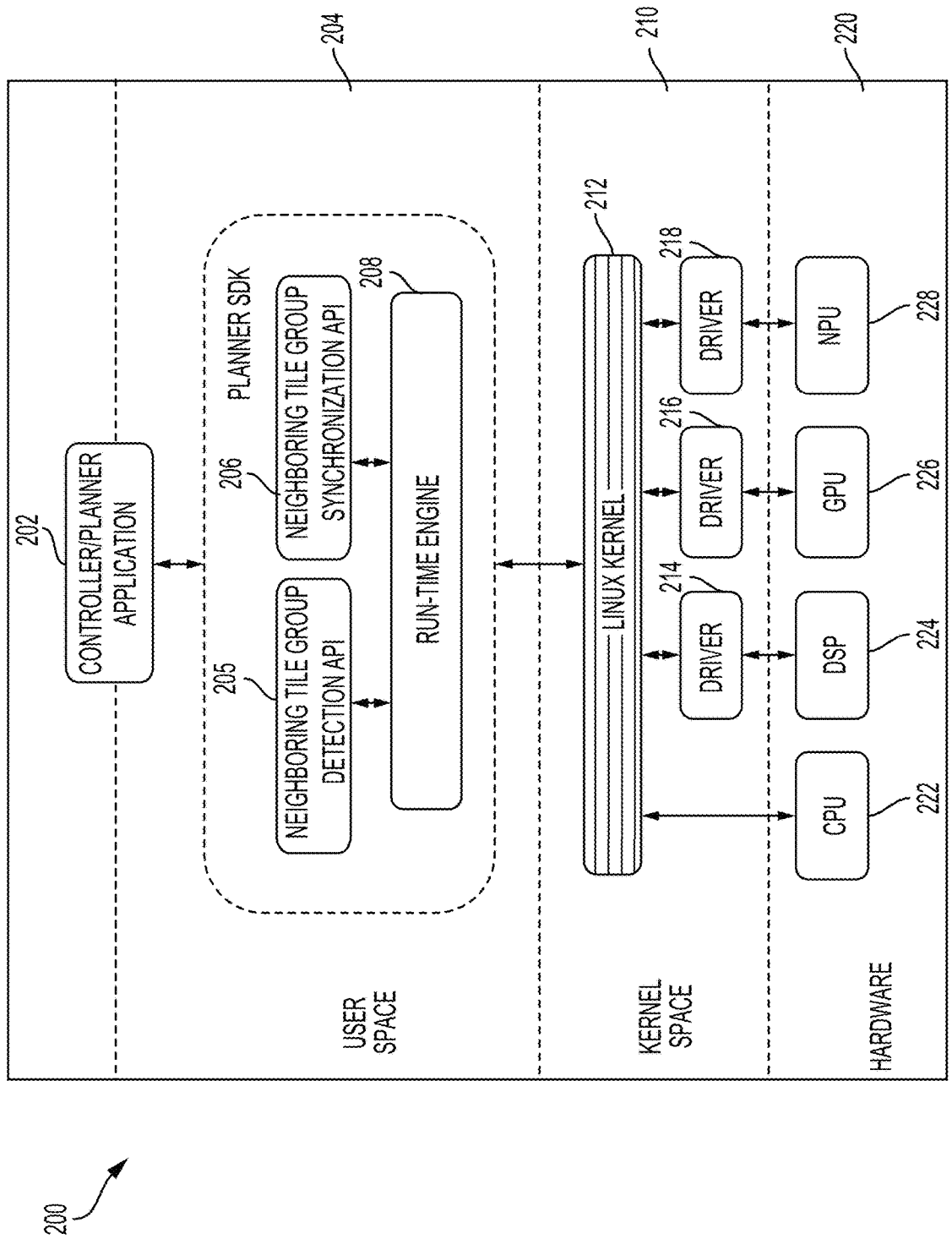
FIG. 2 is a block diagram illustrating a software architecture that may modularize functions for neighboring tile synchronization in high definition (HD) maps, according to aspects of the present disclosure.

FIG. 2 is a block diagram illustrating a software architecture 200 that may modularize functions for neighboring tile synchronization in high definition (HD) maps, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a scene in a video captured by a monocular camera of an ego vehicle based on a high definition (HD) map of objects in the scene. In aspects of the present disclosure, neighboring tile groups having road features that cross boundaries of the neighboring tile group are independently optimized. The controller/planner application 202 may make a request to compile program code associated with a library defined in a neighboring tile group detection application programming interface (API) 205 to select a first tile group and a second tile group that border one another on a first tile in the first tile group and a second tile in the second tile group.

In some aspects of the present disclosure, the controller/planner application 202 may make a request to compile program code associated with a library defined in a neighboring tile group synchronization API 206 to independently optimize the first tile group and the second tile group if a feature crosses between the first tile group and the second tile group. For example, the neighboring tile synchronization may shift a border of the first tile group and a border of the second tile group to join the first tile and the second tile in the second tile group or the first tile group.

A run-time engine 208, which may be compiled code of a run-time framework, may be further accessible to the controller/planner application 202. The controller/planner application 202 may cause the run-time engine 208, for example, to perform neighboring tile synchronization in high definition (HD) maps used to navigate an ego vehicle. When an object is detected within a predetermined distance of the ego vehicle, the run-time engine 208 may in turn send a signal to an operating system 210, such as a Linux Kernel 212, running on the system-on-a-chip (SOC) 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
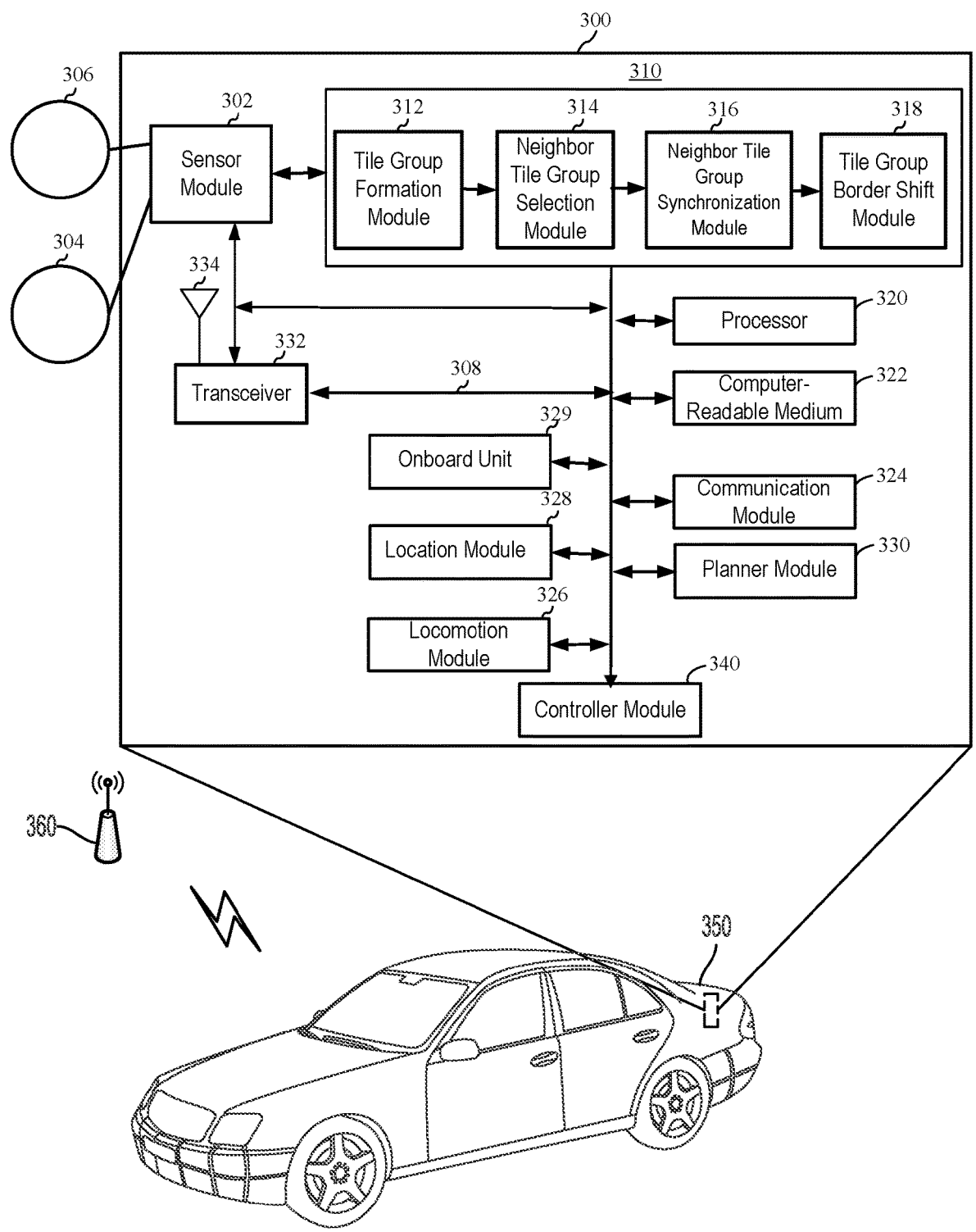
FIG. 3 is a diagram illustrating an example of a hardware implementation for a neighboring tile synchronization system, according to aspects of the present disclosure.

FIG. 3 is a diagram illustrating an example of a hardware implementation for a neighboring tile synchronization system, according to aspects of the present disclosure. A neighboring tile synchronization system 300 may be a configured group of neighboring tiles of the electronic map into tile groups. The neighboring tile synchronization may also select a first tile group and a second tile group that border one another on a first tile in the first tile group and a second tile in the second tile group. The neighboring tile synchronization system 300 may also independently optimize the first tile group and the second tile group if a feature crosses between the first tile group and the second tile group. The neighboring tile synchronization system 300 may shift a border of the first tile group and a border of the second tile group to join the first tile and the second tile in the second tile group or the first tile group.

The neighboring tile synchronization system 300 may be a component of a vehicle, a robotic device, or other device. For example, as shown in FIG. 3, the neighboring tile synchronization system 300 is a component of the car 350. Aspects of the present disclosure are not limited to the neighboring tile synchronization system 300 being a component of the car 350, as other devices, such as a bus, motorcycle, or other like vehicle, are also contemplated for using the neighboring tile synchronization system 300. The car 350 may be autonomous or semi-autonomous.

The neighboring tile synchronization system 300 may be implemented with an interconnected architecture, represented generally by an interconnect 308. The interconnect 308 may include any number of point-to-point interconnects, buses, and/or bridges depending on the specific application of the neighboring tile synchronization system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The neighboring tile synchronization system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit a probabilistic map of objects within a video and/or planned actions from the vehicle perception module 310 to a server (not shown).

The neighboring tile synchronization system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the neighboring tile synchronization system 300 to perform the various functions described for ego vehicle perception of objects of interest for an ego vehicle within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, feature information determined from images captured by the first sensor 304 and/or the second sensor 306 may be transmitted via the transceiver 332. The first sensor 304 and the second sensor 306 may be coupled to the car 350 or may be in communication with the car 350.

Operation of autonomous agents and advanced driver assistance systems (ADAS), such as the car 350, generally relies on an annotated high definition (HD) map to navigate surrounding roads and highways to reach a destination. Electronic maps, such as HD maps utilized by autonomous vehicles, are typically broken into tiles, such as hexagonal tiles. Each of these tiles may include cells that define features within the tiles, such as locations of roads. Unfortunately, features, such as roads, may span multiple neighboring tiles. Achieving a matchup between roads and features of the neighboring tiles generally involves significant computational resources.

A method that utilizes grouped optimization to match features across neighboring tiles is desired. Aspects of the present disclosure recognize that HD maps utilized by autonomous vehicles, are typically broken into tiles, such as hexagonal tiles, including cells that define features within the tiles, such as locations of roads. When road features span multiple tiles, achieving a perfect matchup between road features of neighboring tiles generally involves significant computational resources. Some aspects of the neighboring tile synchronization system 300 are directed to a method that utilizes grouped optimization to match road features across neighboring tiles.

In some aspects of the present disclosure, a neighboring tile synchronization method divides tiles into separate groups of tiles (e.g., groups of seven). In this configuration, road features that cross boundaries of a tile group are independently optimized. Stated differently, a first group is independently optimized and a second group is independently optimized. The process optimizes the conditional distribution of each of the boundary crossings. Importantly, individual tiles are not optimized, only features that cross tile groups. To optimize road features that cross other tiles within a group, the neighboring tile synchronization method shifts the borders of the tile groups to ensure that each tile undergoes a joint optimization with its neighbors. This shifting continues until each tile has undergone a joint optimization.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHZ (review); EN 12795:2002 Dedicated Short-Range Communication (DSRC)-DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, fifth generation (5G) new radio (NR), long term evolution (LTE), third generation (3G), etc. The communication module 324 may also communicate with other components of the car 350 that are not modules of the neighboring tile synchronization system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth R communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VOLTE), or any other mobile data network or combination of mobile data networks. Further, the network access point 360 may include one or more Institute of Electrical and Electronics Engineers (IEEE) 802.11 wireless networks.

The neighboring tile synchronization system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and highly autonomous vehicle.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306. In this aspect of the present disclosure, the vehicle perception module performs neighboring tile synchronization of road features that cross neighboring tiles from images captured by the first sensor 304 or the second sensor 306 of the car 350.

As shown in FIG. 3, the vehicle perception module 310 includes a tile group formation module 312, a neighbor tile group selection module 314, a neighbor tile group synchronization module 316, and a tile group border shift module 318. The tile group formation module 312, the neighbor tile group selection module 314, the neighbor tile group synchronization module 316, and the tile group border shift module 318 may be components of a same or different artificial neural network, such as a deep neural network (DNN). The components of the vehicle perception module 310 are not limited to a DNN. In operation, the vehicle perception module 310 receives a data stream from the first sensor 304 and/or the second sensor 306. The data stream may include a two-dimensional red-green-blue (2D RGB) image from the first sensor 304 and light detection and ranging (LIDAR) data points from the second sensor 306. The data stream may include multiple frames, such as image frames. In this configuration, the first sensor 304 captures monocular (single camera) 2D RGB images.

The vehicle perception module 310 is configured to provide neighboring tile synchronization of electronic HD maps used to navigate the car 350. The tile group formation module 312 is configured to group neighboring tiles of the electronic map into tile groups. Based on this grouping of the electronic map, the neighbor tile group selection module 314 is configured to select a first tile group and a second tile group that border one another on a first tile in the first tile group and a second tile in the second tile group. Based on this selection, the neighbor tile group synchronization module 316 is configured to independently optimize the first tile group and the second tile group if a feature crosses between the first tile group and the second tile group. In addition, the tile group border shift module 318 is configured to shift a border of the first tile group and a border of the second tile group to join the first tile and the second tile in the second tile group or the first tile group to ensure that each tile undergoes a joint optimization with its neighbors.

An electronic map used to navigate the car 350 may be generated using simultaneous localization and mapping (SLAM) based on a fleet of mapping vehicles. SLAM provides a tool for constructing and/or updating a map of an unknown environment while simultaneously keeping track of an agent's location within the map. Factor graphs provide a solution for constructing and/or updating the map of an unknown environment while simultaneously keeping track of the agent's location within the map. Factor graphs are based on concepts in computational geometry and computer vision, and are used in robot navigation, robotic mapping, and odometry for virtual reality and/or augmented reality. Reconstructing a geometric representation of the world partition may be performed using factor graphs. While factor graphs are widely used in the mapping community, factor graphs do not scale to enable the parallelism specified for mapping the world.

Figure 4A:
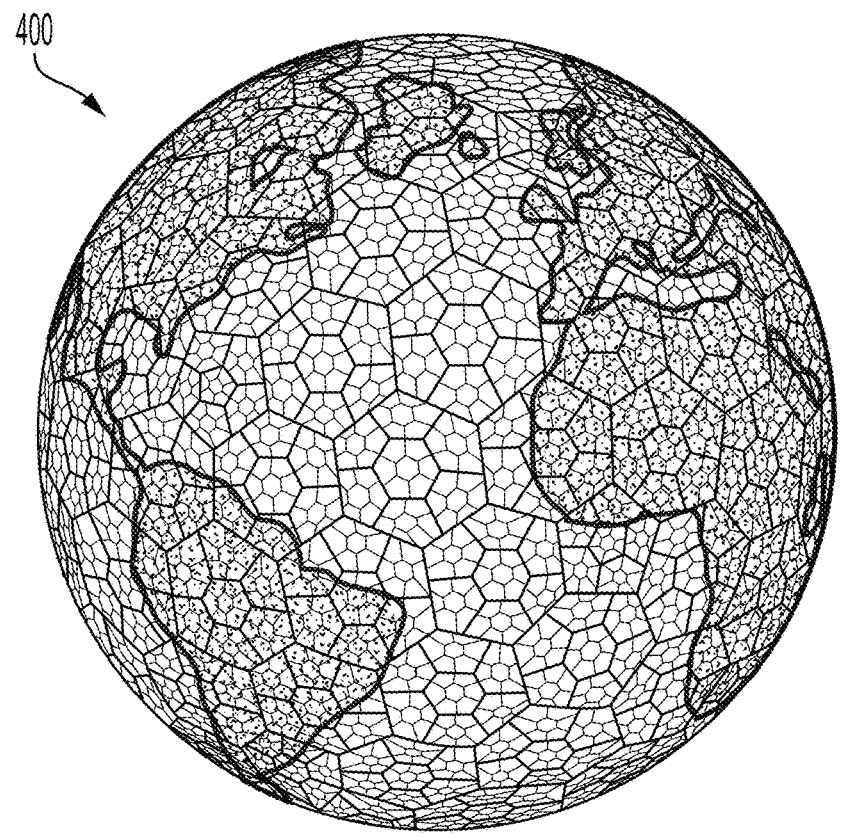
FIGS. 4A and 4B are diagrams illustrating a world partition using non-overlapping shapes and a sample grouping of the overlapping shapes, according to aspects of the present disclosure.
Figure 4B:
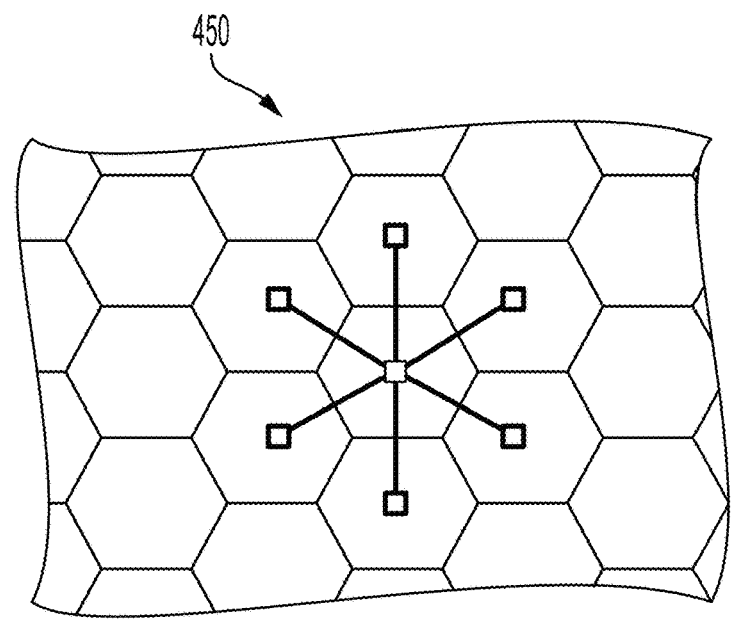

FIGS. 4A and 4B are diagrams illustrating a world partition using non-overlapping shapes and a sample grouping of the overlapping shapes, according to aspects of the present disclosure. As shown in FIGS. 4A and 4B, the world partition 400, based on the sample grouping of the overlapping shapes 450, enables mapping of the world using, for example, simultaneous localization and mapping (SLAM) and a fleet of mapping vehicles. In this example, the world partition 400 relies on hexagons. Reconstructing a geometric representation of the world partition 400 may be performed using factor graphs, which may be referred interchangeable as SLAM or factor graphs. While SLAM graphs are widely used in the mapping community, SLAM graphs do not scale to enable the parallelism to map the world. In some aspects of the present disclosure, sub-mapping based on the sample grouping of the overlapping shapes 450 enables the use of SLAM graphs to map the world partition 400.

Figure 5:
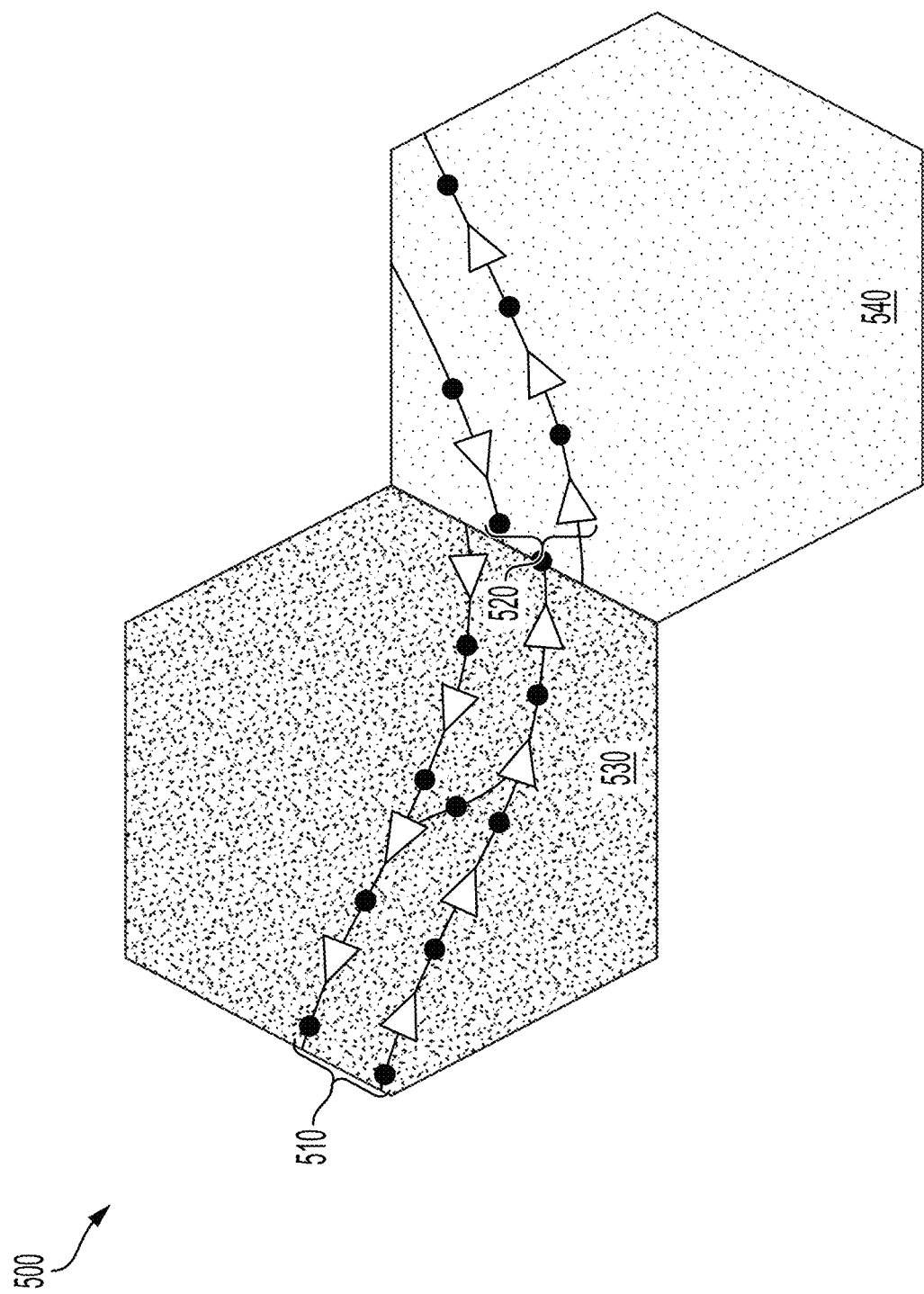
FIG. 5 is a block diagram illustrating a portion of an electronic map overlaid with a factor graph utilized by autonomous vehicles, according to aspects of the present disclosure.

FIG. 5 is a block diagram illustrating a portion of an electronic map overlaid with a factor graph 500 utilized by autonomous vehicles, according to aspects of the present disclosure. Representatively, a first tile 530 and a second tile 540 of an electronic map have a hexagonal shape and are overlaid with a portion of a factor graph 500. In this example, the first tile 530 and the second tile 540 each include cells that define features within the first tile 530 and the second tile 540. For example, cells within the first tile 530 and the second tile 540 can indicate the position and location of roads shown by the factor graph 500. Information utilized to generate the first tile 530 and the second tile 540 may be collected by vehicles outfitted with sensors that collect detailed information regarding the environment surrounding the vehicle.

In practice, features within the first tile 530 may extend to the second tile 540. For example, a road may extend across numerous tiles, as shown by a first portion 510 and a second portion 520 of the factor graph 500. As such, a road that extends across the first tile 530 and the second tile 540 should generally "match up" with each other. FIG. 5 is an example in which the first tile 530 and the second tile 540 have roads that extend between the two tiles, as shown by the first portion 510 and the second portion 520 of the factor graph 500. Unfortunately, the road features of both the first tile 530 and the second tile 540 do not line up. Achieving a perfect matchup of the road features between the first tile 530 and the second tile 540 generally involves significant computational resources.

Figure 6:
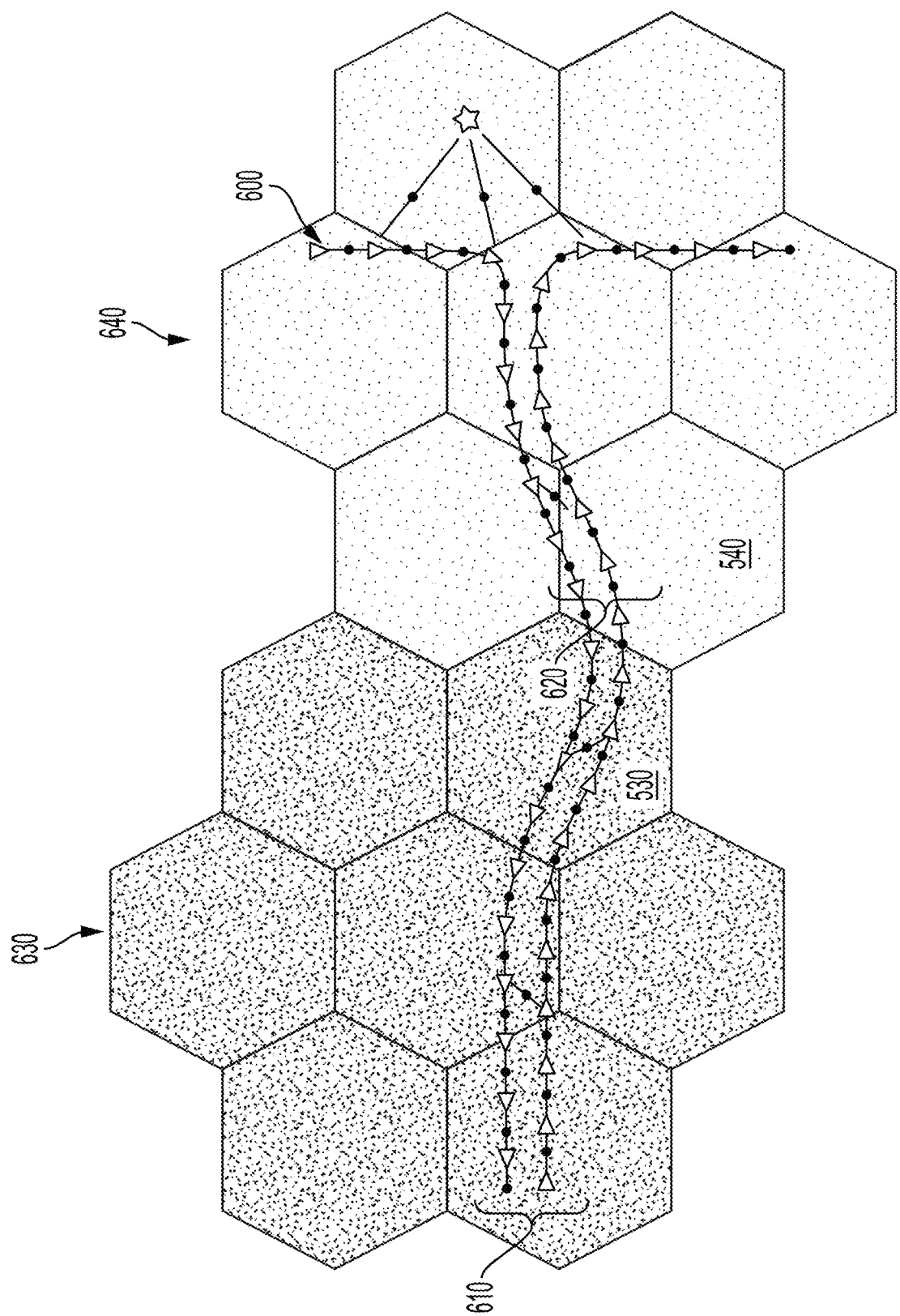
FIG. 6 is a block diagram illustrating two groups of neighboring tiles overlaid with a factor graph, in accordance with an illustrative configuration of the present disclosure.

FIG. 6 is a block diagram illustrating two groups of neighboring tiles overlaid with a factor graph, in accordance with an illustrative configuration of the present disclosure. As shown in FIG. 6, a factor graph 600 is overlaid on a first tile group 630 of neighboring tiles and a second tile group 640 of neighboring tiles. In this example, a first portion 610 of the factor graph 600 is overlaid on the first tile group 630, and a second portion 620 of the factor graph 600 is overlaid on the second tile group 640. This example also illustrates the first tile 530 and the second tile 540 of FIG. 5, that are crossed by the factor graph 600, which represents two roads. In this example, the first tile group 630 and the second tile group 640 are sized to about 5.2 square kilometers. In some aspects of the present disclosure, a perfect matchup of the road features between the first tile 530 and the second tile 540 may be achieved by performing a group optimization, for example, as shown in FIG. 7.

Figure 7:
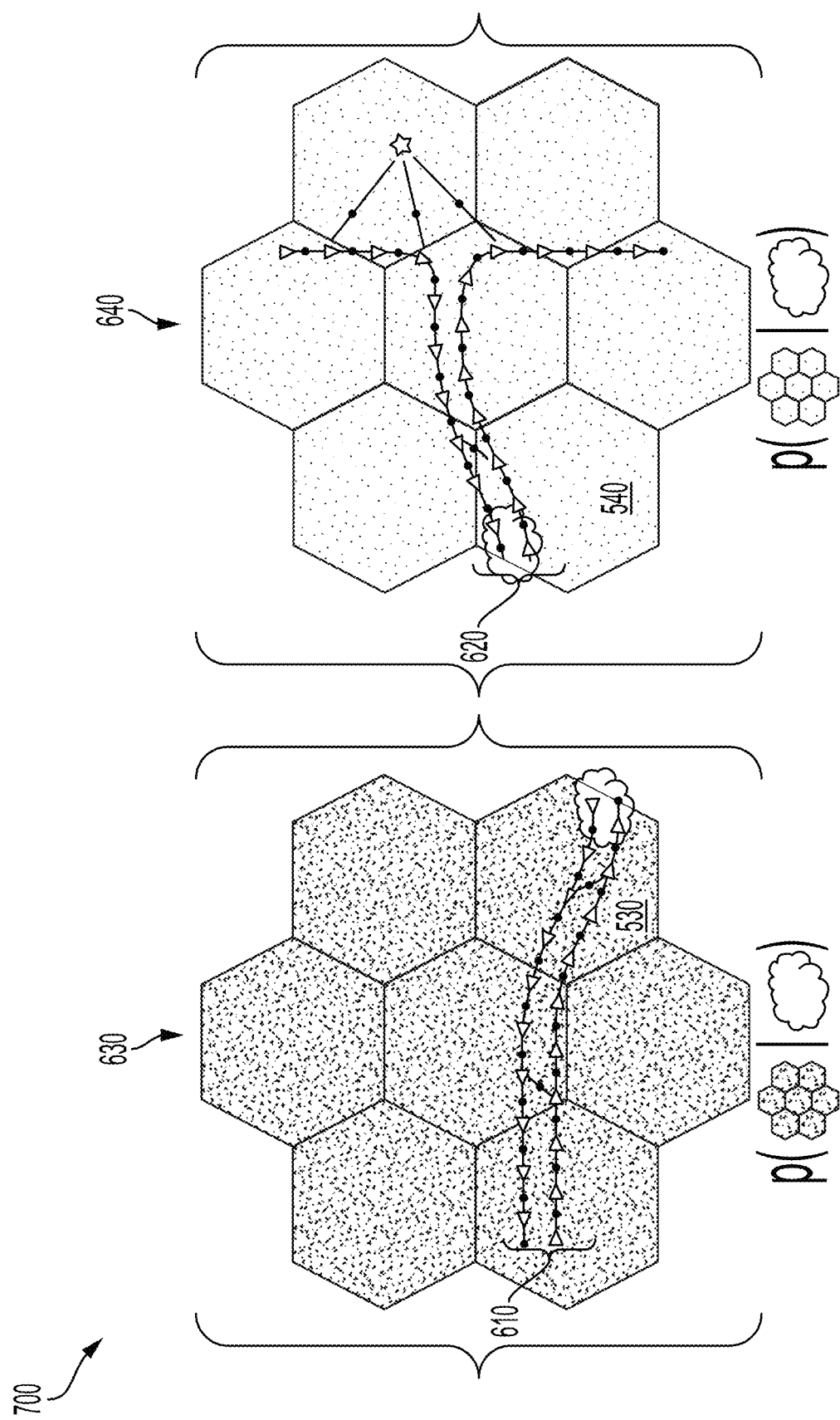
FIG. 7 is a diagram illustrating a grouped, neighboring tile optimization to match features across different tiles, according to aspects of the present disclosure.

FIG. 7 is a diagram 700 illustrating a grouped, neighboring tile optimization to match features across different tiles, according to aspects of the present disclosure. As shown in FIG. 6, the factor graph 600 is composed of a simultaneous localization and mapping (SLAM) graph that extends across several tiles, including at least the first tile 530 and the second tile 540. In this example, the tiles traversed by the factor graph 600 are divided into the first tile group 630 and the second tile group 640 (e.g., groups of seven). According to aspects of the present disclosure, features that cross boundaries of a tile group are independently optimized.

Stated differently, the first tile group 630 and the second tile group 640 are independently optimized. In this example, the first tile group 630 and the second tile group 640 are sized to compensate for odometry error.

As shown in FIG. 7, the optimization of the first tile group 630 and the second tile group 640 optimizes the conditional distribution of each of the boundary crossings by the factor graph 600, as noted by the first tile 530 and the second tile 540. According to aspects of the present disclosure, individual tiles are not optimized; optimization is limited to features that cross tile groups, such as the first tile group 630 and the second tile group 640. A neighboring tile synchronization process may be performed to optimize features that cross other tiles within a tile group, for example, as shown in FIGS. 8A and 8B.

Figure 8A:
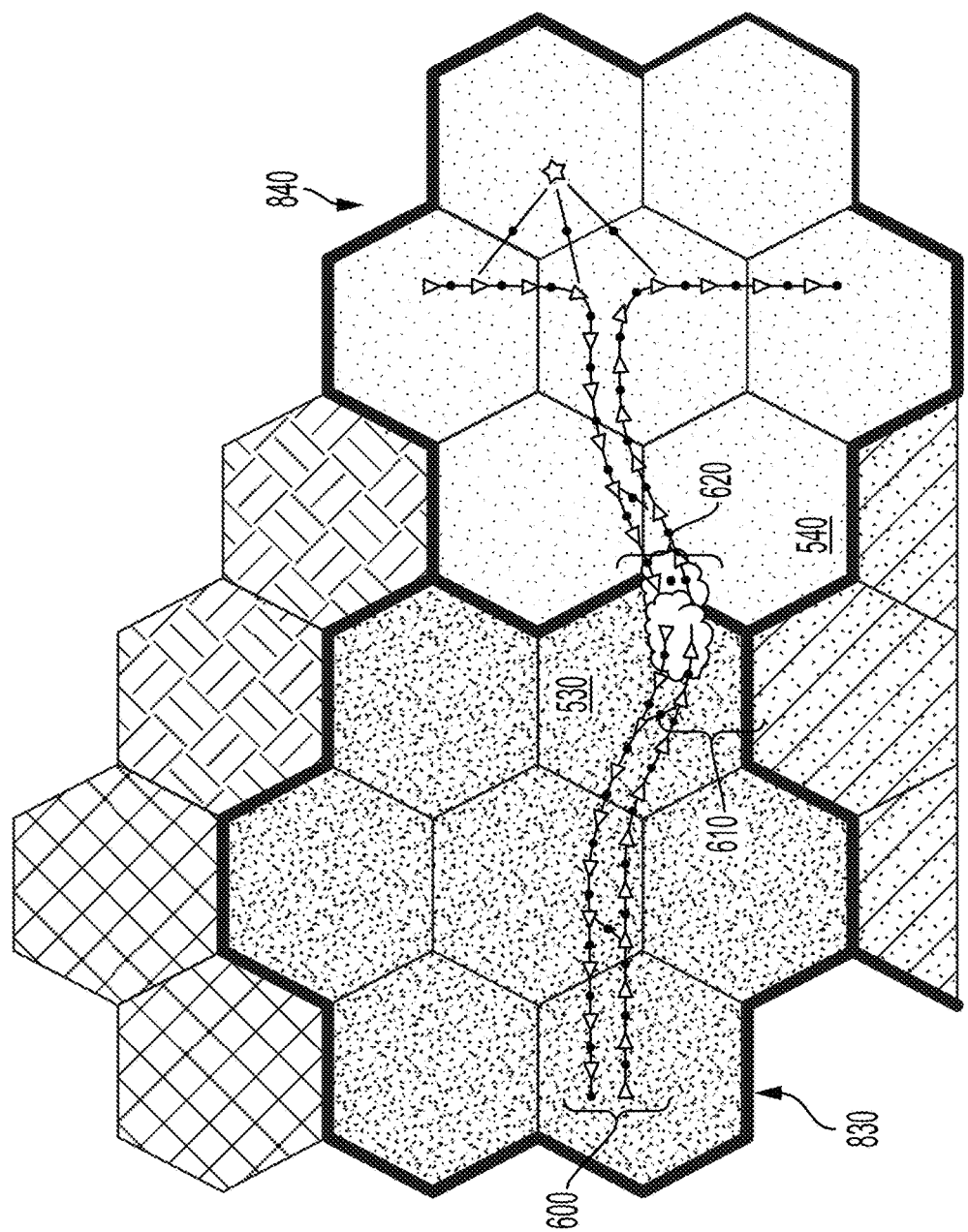
FIGS. 8A and 8B are block diagrams further illustrating an optimization of the two groups of neighboring tiles overlaid with a factor graph of FIG. 6, in accordance with an illustrative configuration of the present disclosure.
Figure 8B:
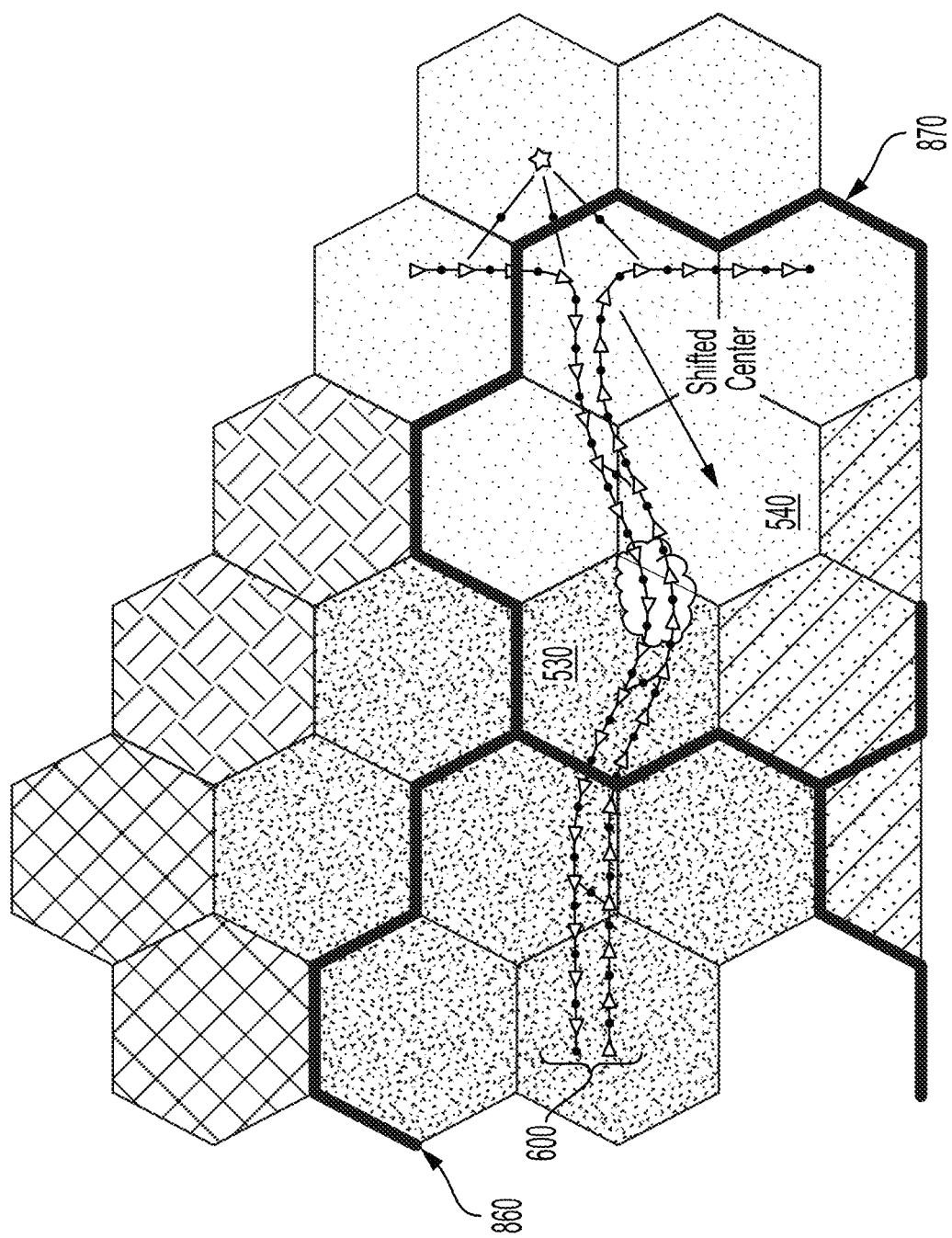

FIGS. 8A and 8B are block diagrams 800 and 850, respectively, further illustrating an optimization of the two groups of neighboring tiles overlaid with a factor graph of FIG. 6, in accordance with an illustrative configuration of the present disclosure. As shown in FIG. 8A, a first border 830 encloses the first tile group 630, and a second border 840 encloses the second tile group 640. In this example, the road feature shown by the factor graph 600 crosses other tiles within the first tile group 630, and the second tile group 640 aligns features between the first tile 530 and the second tile 540 through optimization.

FIG. 8B illustrates a grouped optimization method that shifts the borders of the tile groups to ensure that each tile undergoes a joint optimization with its neighbors, according to aspects of the present disclosure. In this example, the first border 830 of the first tile group 630, and the second border 840 of the second tile group 640 are shifted toward the first tile 530. As a result of the shifting, the first tile 530 and the second tile 540 are now part of a shifted tile group enclosed within a shifted tile border 870, having the second tile 540 as a central tile. An additional shifted tile border 860 encloses tiles from the first tile group 630 as well as new tiles. According to aspects of the present disclosure, the conditional joint optimization is also applied to the shifted tile groups. This shifting continues until each tile has undergone a joint optimization with each of the surrounding, neighboring tiles to complete the grouped optimization process, for example, as shown in FIGS. 9A and 9B.

Figure 9A:
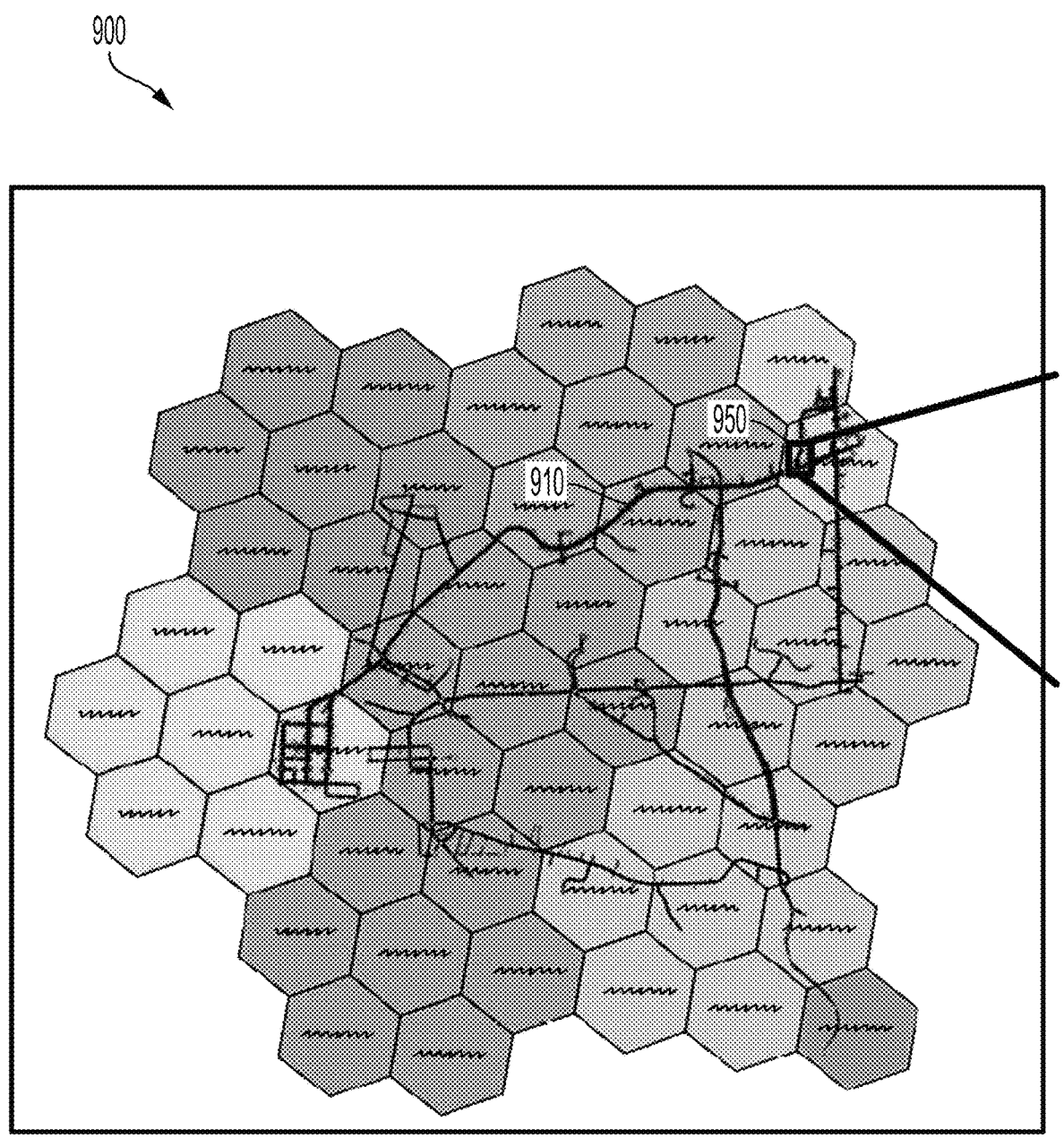
FIGS. 9A and 9B illustrate a group optimized electronic map and an exploded portion of the group optimized electronic map, respectively, according to aspects of the present disclosure.
Figure 9B:
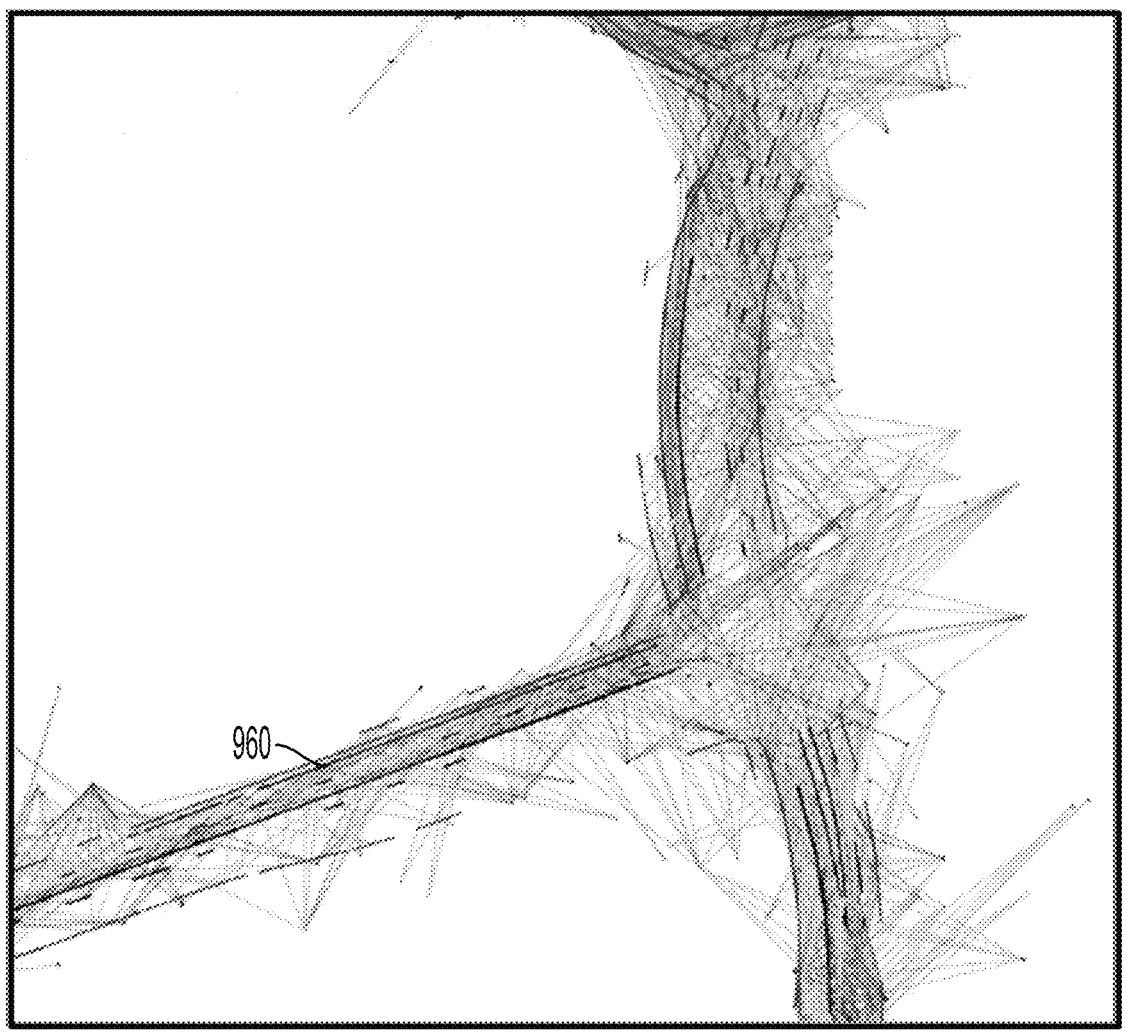

FIGS. 9A and 9B illustrate a group optimized electronic map 900 and an exploded portion 950 of the group optimized electronic map 900, respectively, according to aspects of the present disclosure. As shown in FIG. 9A, the group optimized electronic map 900 includes roads 910 that traverse various groups of tiles, which are subjected to a group optimization. As shown in FIG. 9A, the group optimized electronic map 900 aligns the roads 910 that traverse various groups of tiles by applying a tile group optimization, according to aspects of the present disclosure. FIG. 9B illustrates an exploded portion 950 of the group optimized electronic map 900, according to aspects of the present disclosure. FIG. 9B illustrates various simultaneous localization and mapping (SLAM) graphs 960 that further illustrate the exploded portion 950 of the group optimized electronic map 900. This process may be performed according to a tile group optimization method, for example, as shown in FIG. 10.

Figure 10:
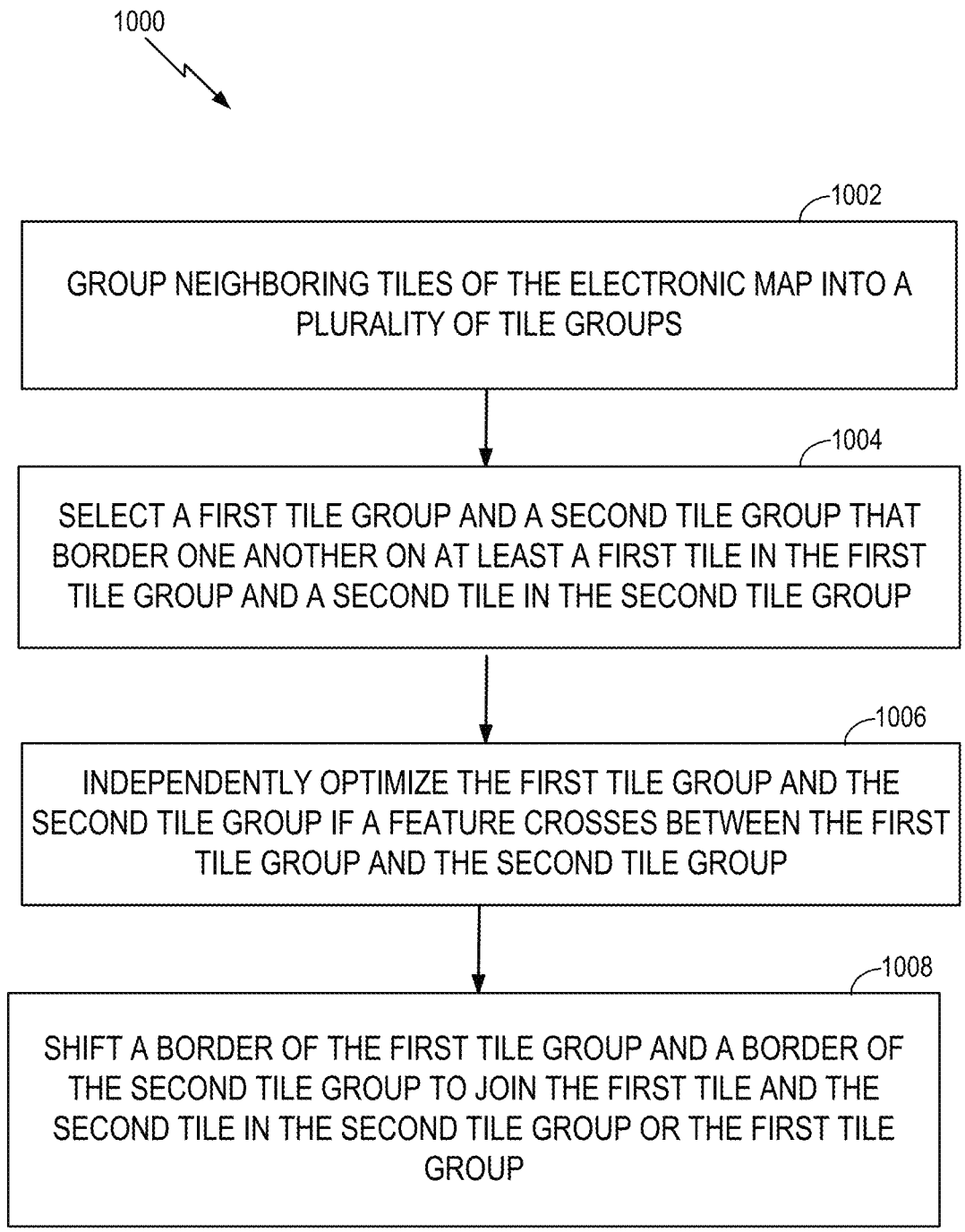
FIG. 10 is a flowchart illustrating a method for synchronizing neighboring tiles in an electronic map, according to aspects of the present disclosure.

FIG. 10 is a flowchart illustrating a method for synchronizing neighboring tiles in an electronic map, according to aspects of the present disclosure. The method 1000 begins at block 1002, in which neighboring tiles of the electronic map are grouped into a plurality of tile groups. For example, as shown in FIG. 6, a grouping of neighboring tiles is performed to form the first tile group 630 of neighboring tiles and the second tile group 640 of neighboring tiles. This example also illustrates the first tile 530 and the second tile 540 of FIG. 5, that are crossed by the factor graph 600, which represents two roads. In this example, the first tile group 630 and the second tile group 640 are sized to about 5.2 square kilometers.

At block 1004, a first tile group and a second tile group are selected that border one another on at least a first tile in the first tile group and a second tile in the second tile group, for example, the first tile group 630 of neighboring tiles and the second tile group 640 of neighboring tiles, as shown in FIG. 6. In this example, a first portion 610 of the factor graph 600 is overlaid on the first tile group 630, and a second portion 620 of the factor graph 600 is overlaid on the second tile group 640. This example also illustrates the first tile 530 and the second tile 540 of FIG. 5, that are crossed by the factor graph 600, which represents two roads. In some aspects of the present disclosure, a perfect matchup of the road features between the first tile 530 and the second tile 540 may be achieved by performing a group optimization, for example, as shown in FIG. 7.

Referring again to FIG. 10, at block 1006, the first tile group and the second tile group are independently optimized if a feature crosses between the first tile group and the second tile group. For example, as shown in FIG. 7, the optimization of the first tile group 630 and the second tile group 640 optimizes the conditional distribution of each of the boundary crossings by the factor graph 600, as noted by the first tile 530 and the second tile 540. According to aspects of the present disclosure, individual tiles are not optimized; optimization is limited to features that cross tile groups, such as the first tile group 630 and the second tile group 640.

At block 1008, a border of the first tile group and a border of the second tile group are shifted to join the first tile and the second tile in the second tile group or the first tile group. For example, as shown in FIG. 8B, the first border 830 of the first tile group 630, and the second border 840 of the second tile group 640 are shifted toward the first tile 530. As a result of the shifting, the first tile 530 and the second tile 540 are now part of a shifted tile group enclosed within a shifted tile border 870, having the second tile 540 as a central tile. An additional shifted tile border 860 encloses tiles from the first tile group 630 as well as new tiles.

The method 1000 may include shifting by moving the border of the first tile group and the border of the second tile group by one tile. The method 1000 may include independently optimizing by separately optimizing the first tile group and the second tile group if a road feature crosses between the first tile group and the second tile group. The method 1000 may include shifting by moving the border of the first tile group and the border of the second tile group to move the first tile from the first tile group to the second tile group to join the first tile and the second tile in the second tile group, as shown in FIG. 8B. Alternatively, the method 1000 may include shifting by moving the border of the first tile group and the border of the second tile group to move the second tile from the second tile group to the first tile group to join the first tile and the second tile in the first tile group. The method 1000 may include shifting by moving tiles from a third tile group to the first tile group or the second tile group, as shown in FIG. 8B.

In some aspects of the present disclosure, the method 1000 may be performed by the system-on-a-chip (SOC) 100 (FIG. 1) or the software architecture 200 (FIG. 2) of the ego vehicle 150 (FIG. 1). That is, each of the elements of method 1000 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array (FPGA) signal or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for synchronizing neighboring tiles in an electronic map, comprising:
   grouping neighboring tiles of the electronic map into a plurality of tile groups;
   selecting a first tile group and a second tile group that border one another on at least a first tile in the first tile group and a second tile in the second tile group;
   independently optimizing the first tile group and the second tile group when a feature crosses between the first tile group and the second tile group; and
   shifting a border of the first tile group and a border of the second tile group to join the first tile and the second tile in the second tile group or the first tile group of the electronic map; and
   controlling a trajectory of an ego vehicle according to the electronic map.

2. The method of claim 1, further comprising repeating the selecting, independently optimizing, and shifting for neighboring tile groups of the plurality of tile groups having a feature crossing the neighboring tile groups.

3. The method of claim 1, in which the feature crosses the first tile to the second tile, between the first tile group and the second tile group.

4. The method of claim 1, in which shifting comprises moving the border of the first tile group and the border of the second tile group by one tile.

5. The method of claim 1, in which independently optimizing comprises separately optimizing the first tile group and the second tile group if a road feature crosses between the first tile group and the second tile group.

6. The method of claim 1, in which shifting comprises moving the border of the first tile group and the border of the second tile group to move the first tile from the first tile group to the second tile group to join the first tile and the second tile in the second tile group.

7. The method of claim 1, in which shifting comprises moving the border of the first tile group and the border of the second tile group to move the second tile from the second tile group to the first tile group to join the first tile and the second tile in the first tile group.

8. The method of claim 1, in which shifting further comprises moving tiles from a third tile group to the first tile group or the second tile group.

9. A non-transitory computer-readable medium having program code recorded thereon for synchronizing neighboring tiles in an electronic map, the program code being executed by a processor and comprising:
   program code to group neighboring tiles of the electronic map into a plurality of tile groups;
   program code to select a first tile group and a second tile group that border one another on at least a first tile in the first tile group and a second tile in the second tile group;
   program code to independently optimize the first tile group and the second tile group when a feature crosses between the first tile group and the second tile group;
   program code to shift a border of the first tile group and a border of the second tile group to join the first tile and the second tile in the second tile group or the first tile group of the electronic map; and
   program code to control a trajectory of an ego vehicle according to the electronic map.

10. The non-transitory computer-readable medium of claim 9, further comprising program code to repeat the program code to select, the program code to independently optimize, and the program code to shift the border for neighboring tile groups of the plurality of tile groups having a feature crossing the neighboring tile groups.

11. The non-transitory computer-readable medium of claim 9, in which the feature crosses the first tile to the second tile, between the first tile group and the second tile group.

12. The non-transitory computer-readable medium of claim 9, in which the program code to shift comprises program code to move the border of the first tile group and the border of the second tile group by one tile.

13. The non-transitory computer-readable medium of claim 9, in which the program code to independently optimize comprises program code to separately optimize the first tile group and the second tile group if a road feature crosses between the first tile group and the second tile group.

14. The non-transitory computer-readable medium of claim 9, in which the program code to shift comprises program code to move the border of the first tile group and the border of the second tile group to move the first tile from the first tile group to the second tile group to join the first tile and the second tile in the second tile group.

15. The non-transitory computer-readable medium of claim 9, in which the program code to shift comprises program code to move the border of the first tile group and the border of the second tile group to move the second tile from the second tile group to the first tile group to join the first tile and the second tile in the first tile group.

16. The non-transitory computer-readable medium of claim 9, in which the program code to shift further comprises program code to move tiles from a third tile group to the first tile group or the second tile group.

17. A system for synchronizing neighboring tiles in an electronic map, the system comprising:
   a tile group formation module to group neighboring tiles of the electronic map into a plurality of tile groups;
   a neighboring tile group selection module to select a first tile group and a second tile group that border one another on at least a first tile in the first tile group and a second tile in the second tile group;
   a neighboring tile group synchronization module to independently optimize the first tile group and the second tile group when a feature crosses between the first tile group and the second tile group;
   a tile group border shift module to shift a border of the first tile group and a border of the second tile group to join the first tile and the second tile in the second tile group or the first tile group of the electronic map; and
   a controller to control a trajectory of an ego vehicle according to the electronic map.

18. The system of claim 17, in which the feature crosses the first tile to the second tile, between the first tile group and the second tile group.

19. The system of claim 17, in which the tile group border shift module is further to move the border of the first tile group and the border of the second tile group by one tile.

20. The system of claim 17, in which the neighboring tile group synchronization module is further to separately optimize the first tile group and the second tile group if a road feature crosses between the first tile group and the second tile group.

* * * * *